US009563829B2

(12) United States Patent
Daigo et al.

(10) Patent No.: US 9,563,829 B2
(45) Date of Patent: Feb. 7, 2017

(54) IMAGE FORMING APPARATUS

(71) Applicant: KYOCERA Document Solutions Inc., Osaka (JP)

(72) Inventors: Hironori Daigo, Osaka (JP); Masuo Kawamoto, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/082,720

(22) Filed: Mar. 28, 2016

(65) Prior Publication Data

US 2016/0292552 A1 Oct. 6, 2016

(30) Foreign Application Priority Data

Mar. 31, 2015 (JP) ................................ 2015-071913

(51) Int. Cl.

*G06K 15/00* (2006.01)
*B65H 7/14* (2006.01)
*B65H 7/06* (2006.01)
*B65H 7/00* (2006.01)

(52) U.S. Cl.

CPC ............ *G06K 15/4085* (2013.01); *B65H 7/00* (2013.01); *B65H 7/06* (2013.01); *B65H 7/14* (2013.01); *G06K 15/005* (2013.01)

(58) Field of Classification Search

CPC .... G06K 15/4085; G06K 15/005; B65H 7/06; B65H 7/14

See application file for complete search history.

(56) References Cited

U.S. PATENT DOCUMENTS

2010/0020370 A1* 1/2010 Ishikawa ............ H04N 1/00413 358/498
2016/0057301 A1* 2/2016 Motoyama ......... H04N 1/00663 358/406

FOREIGN PATENT DOCUMENTS

JP H08-106191 A 4/1996
JP 2006-043896 A 2/2006

* cited by examiner

*Primary Examiner* — Iriana Cruz
(74) *Attorney, Agent, or Firm* — IP Business Solutions, LLC

(57) ABSTRACT

A jam detection section detects a sheet jam on a conveyance path based on results of detection by a sheet detection sensor. A printing stop section stops an image formation operation upon the sheet jam detection by the sheet jam detection section. Upon detection of completion of an operation of resolving the sheet jam by a user by a resolving operation detection section, a sheet breakage confirmation section judges, for the sheet taken out from the conveyance path by the user in the operation of resolving the sheet jam and then loaded on a document stand, whether or not there is any sheet lacking portion, based on image data generated by an image reading section. The stopping release section, upon judgment by the sheet breakage confirmation section that there is no sheet lacking portion, permits execution of image formation.

8 Claims, 5 Drawing Sheets

501 502 504 103

503

IMAGE FORMING APPARATUS

INCORPORATION BY REFERENCE

This application claims priority to Japanese Patent Application No. 2015-71913 filed on Mar. 31, 2015, the entire contents of which are incorporated by reference herein.

BACKGROUND

This disclosure relates to an image forming apparatus.

Widely used in offices, etc. in recent years are multifunction peripherals (MFPs) including functions such as a scanner, a facsimile, a printer, and a copier. The MFP is used while connected to an information processing terminal such as a personal computer via a network, for example, a local area network (LAN) in many cases.

With such an MFP, upon occurrence of a paper jam in which paper (a sheet) cannot move in a midway of a conveyance path, a control is performed to discharge as many pieces of paper (other than the jammed paper) as possible under conveyance. This can minimize a number of pieces of paper under conveyance which paper remain in the apparatus. However, in recent years, for the purpose of shorting print time, a conveyance method of making a plurality of pieces of paper on standby on a conveyance path has been adopted, and in such an MFP, upon occurrence of a paper jam on a downstream side of the conveyance path in a paper conveyance direction, the paper cannot be discharged and the plurality of pieces of paper consequently remain in the apparatus.

As a technology related to this disclosure, there is a trial print function for confirming whether or not there is any error in set image formation condition.

SUMMARY

As one aspect of this disclosure, a technology obtained by further improving the technology described above will be suggested.

An image forming apparatus according to one aspect of this disclosure includes: an image formation section, sheet detection sensors, a jam detection section, a printing stop section, a resolving operation detection section, an image reading section, a sheet breakage confirmation section, and a stopping release section.

The image formation section configured to convey a print sheet and to form an image on the print sheet.

The plurality of sheet detection sensors are arranged on the print sheet conveyance path.

The jam detection section detects a sheet jam on the conveyance path based on results of detection by the sheet detection sensors.

The printing stop section stops an image formation operation upon the sheet jam detection by the sheet jam detection section.

The resolving operation detection section detects completion of an operation of resolving the sheet jam by the user.

The image reading section acquires an image of a sheet loaded on a document stand and generates image data.

The sheet breakage confirmation section, upon the detection of the completion of the resolving operation by the resolving operation detection section, requests for loading the sheet, which has been taken out from the conveyance path by the user in the operation of resolving the sheet jam, onto the document stand, and also judging, for the sheet loaded on the document stand, whether or not there is any sheet lacking portion, based on the image data generated by the image reading section.

The stopping release section, upon judgment by the sheet breakage confirmation section that there is no sheet lacking portion, permits execution of image formation.

DETAILED DESCRIPTION

Hereinafter, one embodiment of this disclosure will be described in detail with reference to the drawings. Hereinafter, this disclosure will be embodied as a digital MFP.

Figure 1:
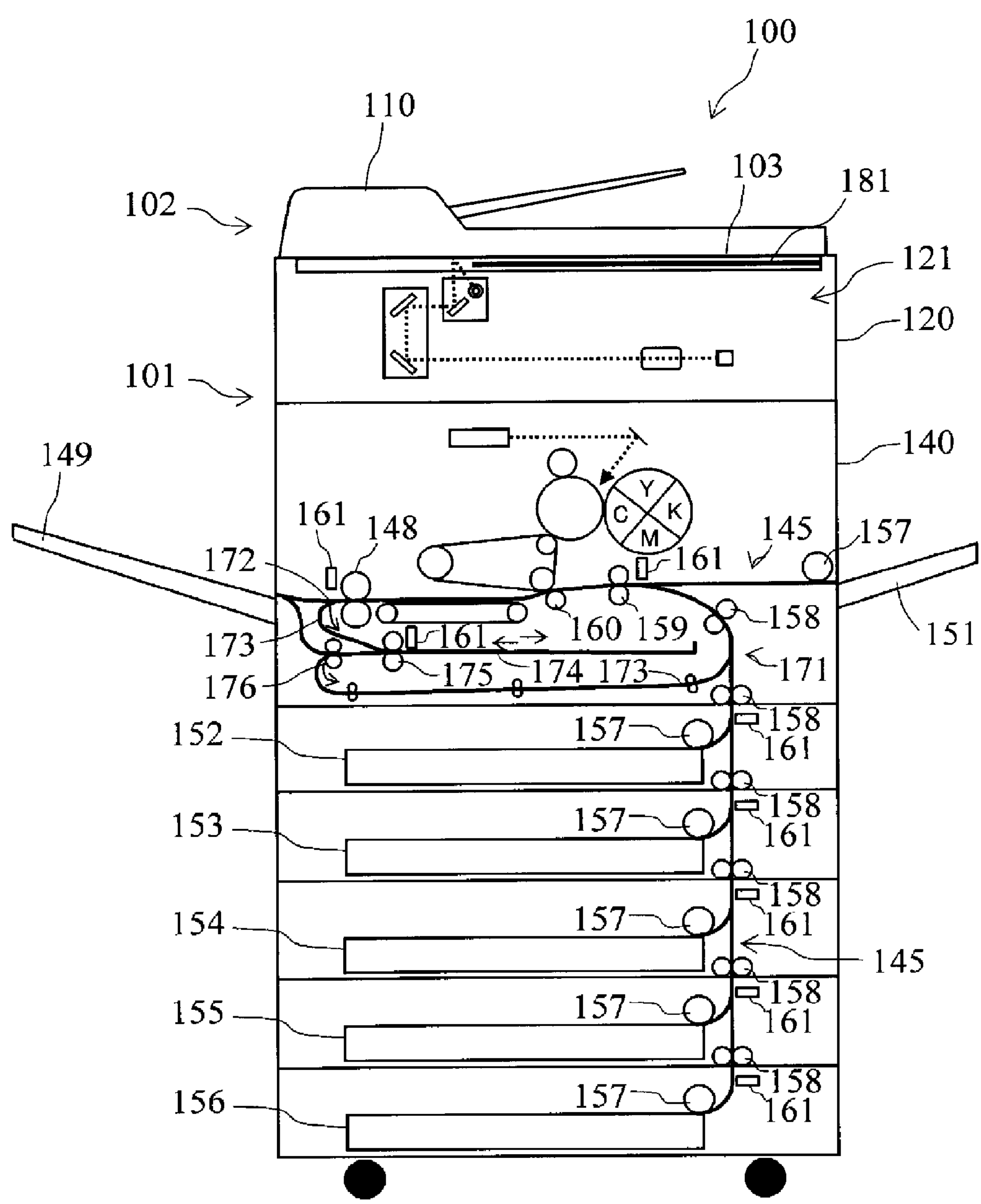
FIG. 1 is a schematic configuration diagram showing overall configuration of an MFP according to one embodiment of this disclosure.

FIG. 1 is a schematic configuration diagram showing one example of overall configuration of the digital MFP according to this embodiment. As shown in FIG. 1, the MFP 100 includes: an apparatus body 101 including an image reading section 120 and an image formation section 140; a platen cover 102 attached to a top of the apparatus body 101. On a top surface of the apparatus body 101, a document stand 103 formed of a transparent plate, for example, contact glass is provided, which is opened and closed by the platen cover 102 formed by a bottom surface of a document conveyance device 110. Moreover, provided on a front surface of the MFP 100 is an operation panel 181 on which a user can provide a copy start instruction and other instructions to the MFP 100 and confirm a status and settings of the MFP 100.

Provided at a top part of the apparatus body 101 is the image reading section 120. The image reading section 120 reads an image of a document by a scanning optical system 121 and generates digital data (image data) of this image. The generated image data can be printed on a sheet such as paper as a transferred body in the image formation section 140. The generated image data can also be transmitted to a different device through a network via, for example, a network interface, not shown.

The image formation section 140 prints, on a sheet, the image data generated by the image reading section 120 or the image data received from the different device connected to the network. The image formation section 140 feeds a sheet from any of a manual feed tray 151 and paper feed cassettes 152, 153, 154, 155, and 156, etc. to a transfer section (image creating section) 160 in which a toner image is transferred. Sheets of various sizes can be loaded or stored in the manual feed tray 151 and the paper feed cassettes 152, 153, 154, 155, and 156. The image formation section 140 selects the sheet specified by the user or the sheet in accordance with a size of the document automatically detected, and feeds the selected sheet by a paper feed roller 157 from the manual feed tray 151 or any of the paper feed cassettes 152, 153, 154, 155, and 156. The fed sheet is conveyed through a conveyance path 145, and is conveyed to the transfer section 160 by a conveyance roller 158 and a registration roller 159 provided on the conveyance path 145. The sheet on which the toner image has been transferred is conveyed to a fixing device 148. The fixing device 148 fixes the toner image onto the sheet through heat and a pressing force. The sheet which has passed through the fixing device 148 is discharged to a paper discharge tray 149.

Moreover, the image formation section 140 includes an inversion section 171 which inverts the sheet for double-side printing. The inversion section 171 includes: a branch section 172, an inverted sheet conveyance path 173, an intermediate tray 174 (sheet holding section), a switchback mechanism 175, and a sheet inversion mechanism 176. The branch section 172 is arranged on a side of the fixing device 148 from which the sheet is discharged, and guides the sheet to the inverted sheet conveyance path 173 of the inversion section 171. The intermediate tray 174 is arranged in a midway of the inverted sheet conveyance path 173, and to this intermediate tray 174, the sheet which has been guided by the branch section 172 and one surface of which has already been subjected to printing is temporarily discharged. The switchback mechanism 175 inverts a conveyance direction of the sheet discharged to the intermediate tray 174, and introduces the sheet to the inverted sheet conveyance path 173. The sheet inversion mechanism 176 inverts a surface of the sheet introduced again to the inverted sheet conveyance path 173 by the switchback mechanism 175, and feeds this sheet to the registration roller 159. This inversion section 171 permits double-side printing by which each of a front surface and a rear surface of the sheet is subjected to printing. A sheet conveyance path forming the inversion section 171 is also included in the conveyance path 145 described above. Note that well-known configuration related to the double-side printing can be adopted for the inversion section 171.

Arranged at a specific position, for example, a plurality of sheet detection sensors 161 are provided near the conveyance roller 158 and the registration roller 159 (here, near an upstream side) on the conveyance path 145. The sheet detection sensors 161 detect whether or not there is any sheet at a corresponding position of the conveyance path 145. The sheet detection sensors 161 can be formed by a non-contact sensor such as a reflective photo sensor (photo reflector) on one surface of which a light emission section and a light reception section are arranged or a transmissive photo sensor (photo interrupter) having a light emission section and a light reception section arranged oppositely to each other. It can also be formed by using a contact sensor such as a micro switch including an actuator.

The MFP 100 continuously conveys a plurality of sheets on conveyance path 145 at time of continuous printing. For example, in a case where a plurality of pages are continuously subjected to one-side printing by use of the sheets stored in the lowest paper feed cassette 156, upon passage of the first sheet through the sensor 161 arranged near a downstream side of a paper feed roller 157, the second sheet is drawn out from the paper feed cassette 156 at predetermined timing. Upon arrival of the first sheet at the registration roller 159, this second sheet is held while sandwiched by the conveyance roller 158 arranged on the conveyance path 145 on an upstream side of a rear end of the previously fed sheet (for example, the conveyance roller 158 which is located on an upstream side of a merging section between the conveyance path 145 directed from the paper feed cassettes 152 to 156 towards the registration roller 159 and the conveyance path 145 directed from the inversion section 171 towards the registration roller 159 and which is located most closely to this merging section). In this case, the two sheets remain on the conveyance path 145.

Moreover, upon delivery of the first sheet from the registration roller 159 towards the transfer section 160, the second sheet described above is held with its tip arriving at the registration roller 159. Moreover, at this point, the third sheet has already been drawn out from the paper feed cassette 156 to the conveyance path 145. This third sheet is held while sandwiched by the conveyance roller 158 by which the second sheet had been held. In this case, the three sheets remain on the conveyance path 145.

Moreover, in a case where the sheets stored in the lowest paper feed cassette 156 are used to carry out continuously subjecting of a plurality of pages to double-side printing, upon passage of the first sheet through the sensor 161 arranged near the downstream side of the paper feed roller 157, the second sheet is drawn out from the paper feed cassette 156. Upon arrival of the first sheet at the registration roller 159, as is the case with the case of one-side printing, this second sheet is held by the conveyance roller 158 which is located on the upstream side of the merging section formed with the inversion section 171 and which is located most closely to this merging section.

Upon delivery of the first sheet from the registration roller 159 towards the transfer section 160, the second sheet described above is held with its tip arriving at the registration roller 159. Moreover, at this point, the third sheet has already been drawn out from the paper feed cassette 156 to the conveyance path 145. This third sheet is held while sandwiched by the conveyance roller 158 by which the second sheet had been held. On the first sheet, an image on the first page is transferred at the transfer section 160, and this sheet is then introduced to the inverted sheet conveyance path 173 and held by the intermediate tray 174.

Upon delivery of the second sheet from the registration roller 159 towards the transfer section 160, the first sheet held by the intermediate tray 174 is conveyed to the inverted sheet conveyance path 173 by the switchback mechanism 175 of the sheet inversion mechanism 176 and held. In parallel, the third sheet described above is held while sandwiched by the registration roller 159. Moreover, at this point, the fourth sheet has already been drawn out from the paper feed cassette 156 to the conveyance path 145. This fourth sheet is held while sandwiched by the conveyance roller 158 by which the third sheet has been held. On the second sheet, an image on the third page is transferred at the transfer section 160, and this second sheet is then introduced to the inverted sheet conveyance path 173 and discharged to the intermediate tray 174.

Upon delivery of the third sheet from the registration roller 159 to the transfer section 160, the next sheet (here, the fourth sheet) is continuously held while sandwiched by the conveyance roller 158. At this point, the first sheet is sent from the inverted sheet conveyance path 173 to the registration roller 159. On this first sheet, an image on the second page (an image to be printed on an opposite surface of the first page) is transferred in the transfer section 160, and this first sheet is then discharged to the paper discharge tray 149. Upon delivery of the first sheet from the registration roller 159 towards the transfer section 160, the second sheet held by the intermediate tray 174 is conveyed to the inverted sheet conveyance path 173 by the switchback mechanism 175 of the sheet inversion mechanism 176 and then held. In parallel, the fourth sheet described above is held while sandwiched by the registration roller 159. Moreover, at this point, the fifth sheet has already been drawn out from the paper feed cassette 156 to the conveyance path 145. This fifth sheet is held while sandwiched by the conveyance roller 158 by which the fourth sheet has been held. As described above, during processing of forming an image on a rear surface of the first sheet, the four sheets remain on the conveyance path 145.

Figure 2:
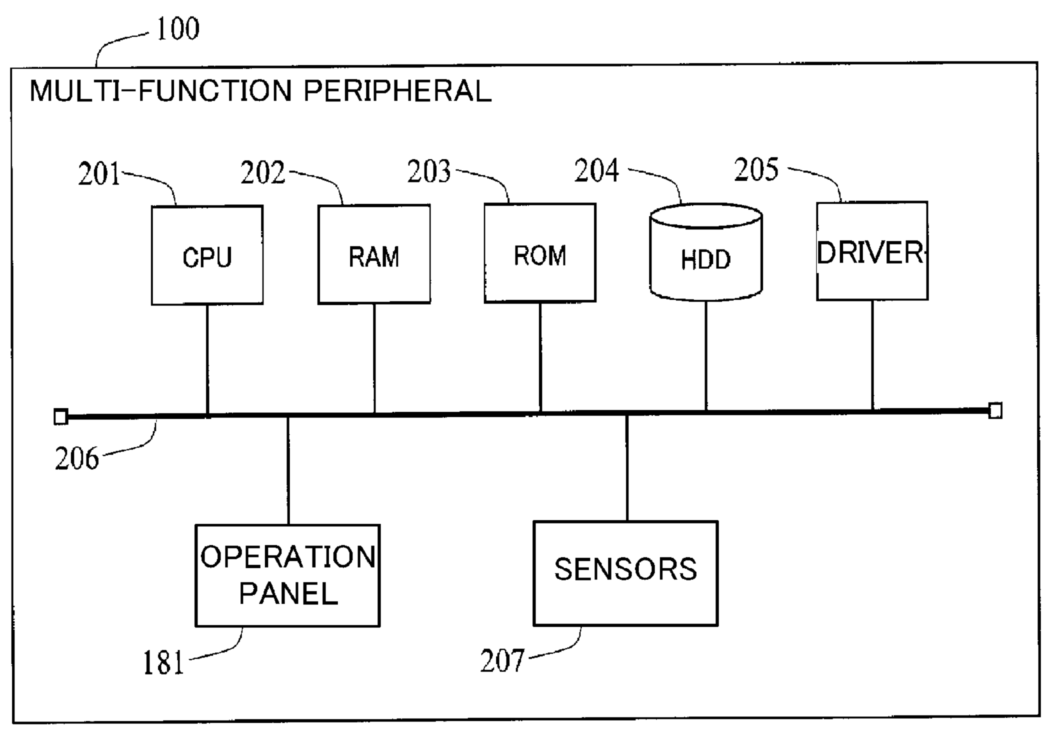
FIG. 2 is a diagram showing hardware configuration of the MFP according to one embodiment of this disclosure.

FIG. 2 is a hardware configuration diagram of a control system in the MFP 100. The MFP 100 of this embodiment has a central processing unit (CPU) 201, a random access memory (RAM) 202, a read only memory (ROM) 203, a hard disc drive (HDD) 204, and a driver 205 corresponding to each driving section in the image reading section 120 and the image formation section 140, all of which are connected together via an internal bus 206. The ROM 203, the HDD 204, etc. store a program, and in accordance with a command of this control program, the control section 201 controls the MFP 100. For example, the CPU 201 uses the RAM 202 as a working area, and provides and receives data and commands to and from the driver 205 to thereby control an operation of each driving section described above. Moreover, the HDD 204 is also used for cumulating the image data acquired by the image reading section 120 and the image data received from the different device through the network.

To the internal bus 206, the operation panel 181 and various sensors 207 are connected. The operation panel 181 receives an operation of the user, and supplies a signal based on this operation to the CPU 201. Moreover, the operation panel 181 displays an operation screen on its own display in accordance with a control signal from the CPU 201. The sensors 207 include various sensors such as a sensor for detecting opening and closing of the platen cover 102, a sensor for detecting a document on the document stand 103, a sensor for a temperature of the fixing device 148, and the sheet detection sensors 161 described above.

The CPU 201 executes, for example, the program stored in the ROM 203 to thereby realize different means (functional blocks) described below and also control operations of the different means in accordance with signals from these sensors.

Figure 3:
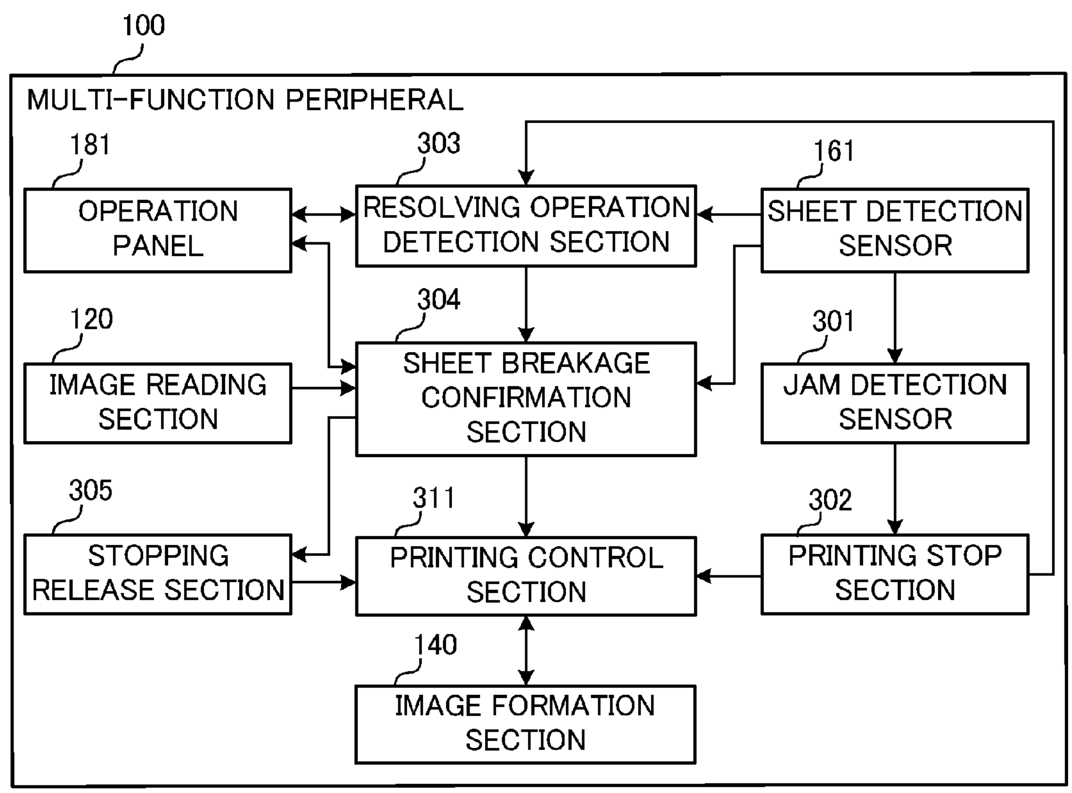
FIG. 3 is a functional block diagram showing the MFP according to one embodiment of this disclosure.

FIG. 3 is a functional block diagram of the MFP of this embodiment. As shown in FIG. 3, the MFP 100 of this embodiment includes: a jam detection section 301, a printing stop section 302, a resolving operation detection section 303, a sheet breakage confirmation section 304, a stopping release section 305, and a printing control section 311.

The printing control section 311 controls execution of image formation processing in the MFP 100 (image formation section 140). Specifically, the printing control section 311 executes printing of image data in the image formation section 140 based on, for example, an image formation instruction provided by the user through the operation panel 181, an image formation instruction inputted through the network, and a facsimile reception instruction inputted through a public communication line.

The jam detection section 301 detects a sheet jam on the conveyance path 145 based on results of detection by the plurality of sheet detection sensors 161 arranged on the conveyance path 145. For example, in a case where the sheet detection sensor 161 does not turn into a non-detected state (sheet is absent) after passage of specified time preset for each sheet detection sensor 161 since turning into a detected state (sheet is present), the jam detection section 301 judges that a sheet jam has occurred at a detection position of this sheet detection sensor 161. Note that the specified time can be set at a different value for each size of the sheet conveyed through the conveyance path 145.

The printing stop section 302, upon the sheet jam detection by the jam detection section 301, stops an image formation operation. As described above, in this embodiment, the printing control section 311 is so configured as to control the image formation processing in the image formation section 140. Thus, in this embodiment, the printing stop section 302 inputs a printing stop instruction to the printing control section 311 to thereby stop the image formation operation of the image formation section 140.

The resolving operation detection section 303 detects completion of a sheet jam resolving operation by the user. Although not specifically limited, in this embodiment, upon detection that the sheet detection sensor 161 which has detected the sheet jam has turned into a non-detected state and also that a door of the apparatus body 101 required to open for the purpose of removing the sheet remaining in the image formation section 140 (for example, the sheet remaining at a position corresponding to the aforementioned sheet detection sensor 161) on the conveyance path 145 has turned from an open state to a closed state, detection section 303 judges that the sheet jam resolving operation by the user has completed. The open and closed states of the door of the apparatus body 101 can easily be detected by, for example, a contact sensor.

The sheet breakage confirmation section 304, upon detection by the resolving operation detection section 303 that the resolving operation has completed, requests for loading, onto the document stand 103, the sheet taken out from the conveyance path 145 by the user in the sheet jam resolving operation. In this embodiment, the sheet breakage confirmation section 304 displays a message on the display included on the operation panel 181 to thereby request the user for loading the sheet onto the document stand 103.

The sheet breakage confirmation section 304, for the sheet loaded on the document stand 103, judges, based on the image data generated by the image reading section 120, whether or not there is any lacking portion of the sheet. For example, through edge detection of the sheet (or a sheet piece), based on whether or not there is any lacking portion having a previously specified area or more, the sheet breakage confirmation section 304 judges whether or not there is any lacking portion. For example, for the image data used for printing by the image formation section 140, the sheet breakage confirmation section 304 judges that there is the lacking portion on this sheet only when the image data acquired by the image reading section 120 has a lacking portion having the predefined area or more.

In a case where a position where the sheet jam has been detected is located downstream of the transfer section 160 which carries out the image formation, an image is formed on the sheet. In particular, on the sheet which has passed through the fixing device 148 (for example, the sheet present in the inversion section 171), the image is fixed on the sheet. In this case, the sheet breakage confirmation section 304 may compare the image data used for printing onto the sheet in the image formation section 140 with the image data acquired by the image reading section 120 to thereby judge whether or not there is any lacking portion, based on whether or not there is any lacking portion having the previously specified area or more.

Upon judgment by the sheet breakage confirmation section 304 that there is no sheet lacking portion, the stopping release section 305 permits execution of the image formation. In this embodiment, the stopping release section 305 inputs a printing restart instruction into the printing control section 311 to thereby permit the execution of the image formation.

Although not specifically limited, in this embodiment, upon judgment by the sheet breakage confirmation section 304 that there is a lacking portion, the stopping release section 305 also permits the execution of the image formation when this sheet lacking portion is loaded on the document stand 103 and an image is acquired by the image reading section 120. In a case where an outline of the sheet lacking portion matches an outline of the sheet piece which has been loaded on the document stand 103 and on which the image has been acquired by the image reading section 120, the stopping release section 305 can judge that the sheet lacking portion has been loaded on the document stand 103.

Moreover, upon the judgment by the sheet breakage confirmation section 304 that there is a sheet lacking portion, even when this sheet lacking portion is not loaded on the document stand 103, the stopping release section 305 permits the execution of the image formation when this sheet is properly conveyed through a confirmed conveyance operation in which one sheet is conveyed on the conveyance path 145. As described above, in this embodiment, the printing control section 311 is so configured as to control the image formation processing performed in the image formation section 140. Thus, in this embodiment, the stopping release section 305 realizes the confirmed conveyance operation by inputting, into the printing control section 311, an instruction for conveying only one sheet. Note that, although not specifically limited, in this embodiment, the stopping release section 305 allows the image formation section to convey the sheet in the confirmed conveyance operation at a speed lower than a sheet conveyance speed in a normal conveyance operation.

For whether or not the sheet is properly conveyed, for example, in the confirmed conveyance operation, upon conveyance of one sheet to the paper discharge tray 149, it can be judged that the sheet is properly conveyed. Moreover, adopted configuration can be such that it is judged that the sheet is properly conveyed in the confirmed conveyance operation upon passage of the sheet through the detection position of the sheet detection sensor 161 which contributes to the sheet jam detection by the jam detection section 301. For example, at least upon successful passage of the sheet by the confirmed conveyance operation described above through a portion of the conveyance path 145 as an arrangement position of the sheet detection sensor 161 which has detected the sheet at time of the sheet jam detection by the jam detection section 301, the stopping release section 305 judges that this sheet has been properly conveyed by the confirmed conveyance operation described above.

Although not specifically limited, in this embodiment, in the confirmed conveyance operation, the stopping release section 305 is so configured as to form, on the sheet, an image related to a printing job stopped by the printing stop section 302. For example, in a case where a print job composed of a total of 20 pages of image data has been executed and printing up to the ten pages has properly completed in the MFP 100, in the confirmed conveyance operation, the image data on the eleventh page is printed. In this case, if printing is permitted later on, the twelfth to twentieth pages are continuously printed. The image data which has gone through proper printing can easily be specified based on a position of each sheet at time of occurrence of the sheet jam.

Figure 4:
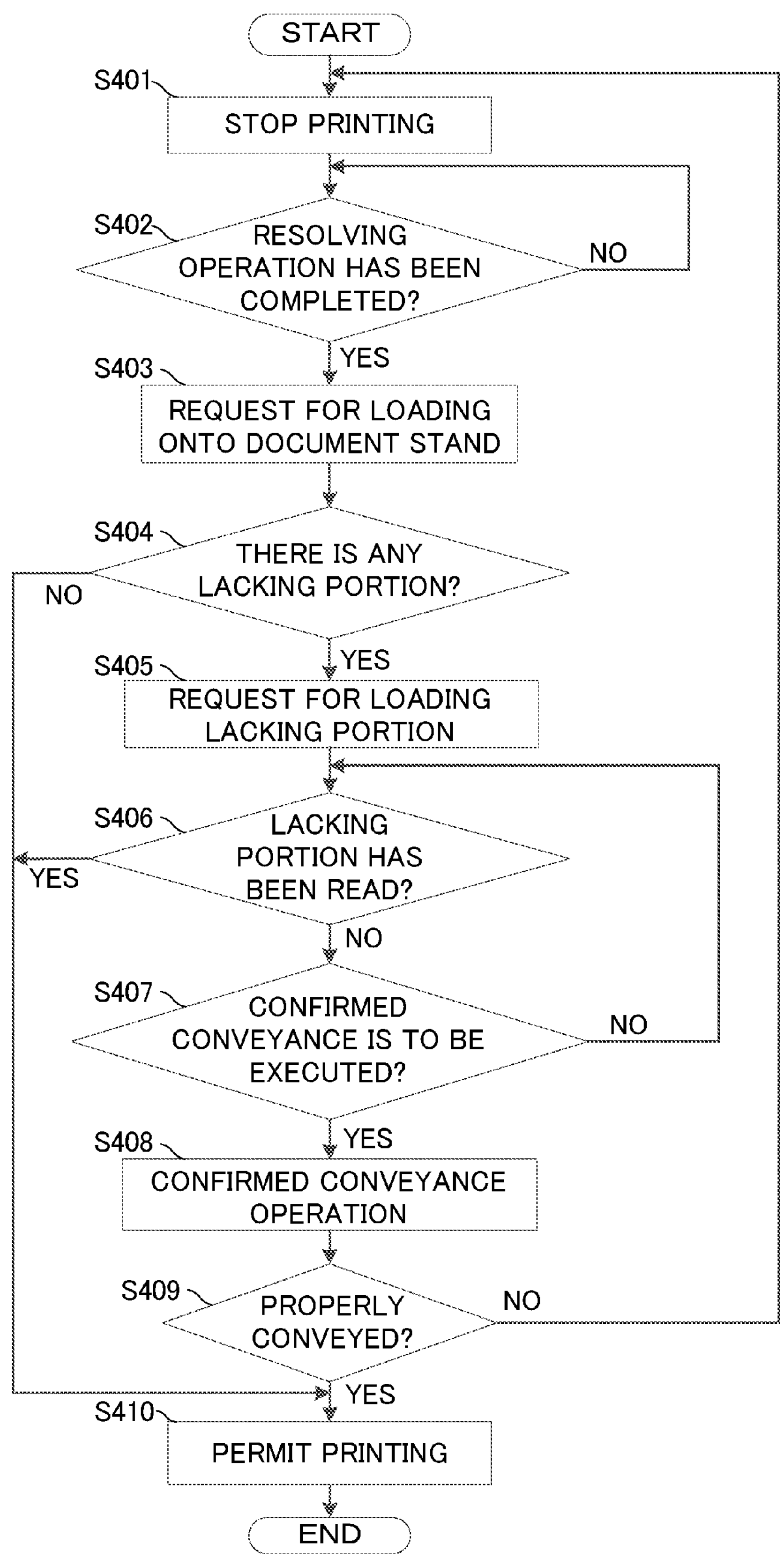
FIG. 4 is a flow diagram showing one example of image formation restart procedures carried out by the MFP according to one embodiment of this disclosure after occurrence of a sheet jam.

FIG. 4 is a flow diagram showing one example of image formation restart procedures executed by the MFP 100 after occurrence of a sheet jam. Start of the procedures is triggered by, for example, detection of the sheet jam on the conveyance path 145 by the jam detection section 301.

The jam detection section 301 which has detected the sheet jam on the conveyance path 145 notifies this to the printing stop section 302. In accordance with this notification, the printing stop section 302 stops the image formation operation in the image formation section 140 by the technique described above (step S401). At this point, the printing stop section 302 notifies the resolving operation detection section 303 that the image formation operation has stopped.

In accordance with this notification, the resolving operation detection section 303 requests the user for removing the jammed sheet and all the sheet remaining on the conveyance path 145. Although not specifically limited, in this embodiment, at this point, the resolving operation detection section 303 is so configured as to sequentially display, on the display included on the operation panel 181, a guidance screen showing a position and a removal method of the jammed sheet and a guidance screen showing positions and removal methods of the other sheets (No in step S402). Then upon detection of completion of the sheet jam resolving operation by the user as described above, the resolving operation detection section 303 notifies this to the sheet breakage confirmation section 304 (Yes in step S402).

In accordance with this notification, the sheet breakage confirmation section 304 requests the user for loading, on the document stand 103, the sheets taken out from the conveyance path 145 by the user in the sheet jam resolving operation (step S403). When the user, in response to this request, has loaded any sheet, which was taken out from the conveyance path, onto the document stand 103 and has pressed an image reading start button included on the operation panel 181, image data of the sheet loaded on the document stand 103 is generated by the image reading section 120. The sheet breakage confirmation section 304 acquires this image data from the image reading section 120, and judges whether or not there is any lacking portion (Step S404). In this embodiment, the sheet breakage confirmation section 304 requests for sequentially loading, onto the document stand 103, all the sheets which have remained on the conveyance path 145.

If no sheet taken out from the conveyance path 145 has been broken, the sheet breakage confirmation section 304 judges that there is no lacking portion (No in step S404). At this point, the sheet breakage confirmation section 304 notifies results of the judgment to the stopping release section 305. In accordance with this notification, the stopping release section 305 permits execution of image formation in the image formation section 140 (step S410). This consequently restarts printing of a print job which has been stopped.

Figure 5:
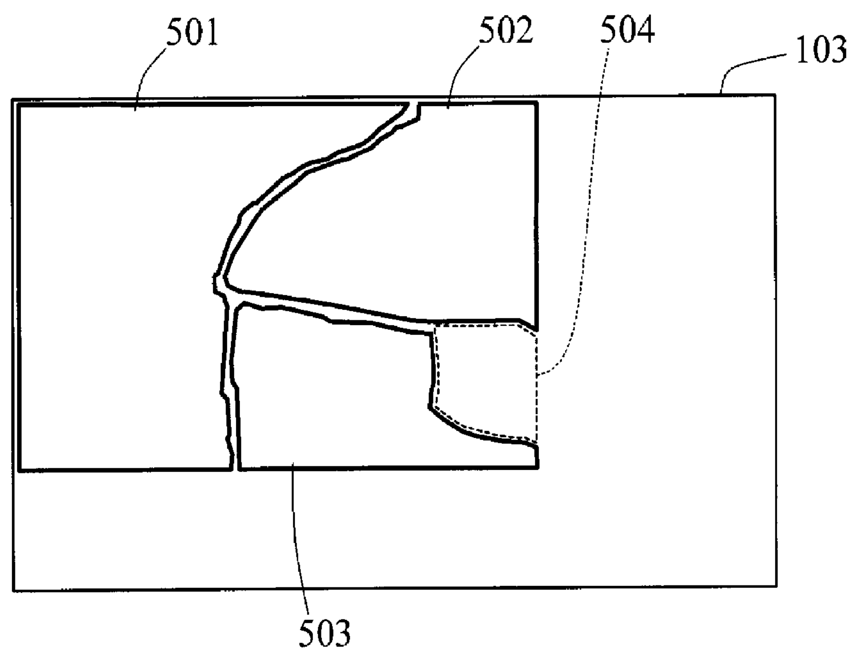
FIG. 5 is a diagram showing one example of image reading of a broken sheet according to one embodiment of this disclosure.

In a case where any sheet taken out from the conveyance path 145 has been broken, the user loads the broken sheet onto the document stand 103, for example, in a state in which its original form is reproduced. FIG. 5 is a diagram showing one example of image reading of the broken sheet. FIG. 5 is a view of the document stand 103 from the above, and illustration of the platen cover 102 is omitted for the description.

In the example of FIG. 5, three sheet pieces 501, 502, and 503 are loaded on the document stand 103 in a state in which their original forms are reproduced, a sheet-piece-lacking portion 504 lies between the sheet piece 502 and the sheet piece 503. Upon pressing of the image reading start button by the user in this state, the sheet breakage confirmation section 304 judges that there is a lacking portion (Yes in step S404). In the example of FIG. 5, if the sheet piece corresponding to the sheet-piece-lacking portion 504 is loaded on a relevant portion, even if a gap (region where no sheet is present) is provided between the sheet pieces, its area is not equal to or larger than the previously specified area, and thus the sheet breakage confirmation section 304 consequently judges that there is no lacking portion (No in step S404).

Upon the judgment that there is a lacking portion, the sheet breakage confirmation section 304 request the user for loading the lacking portion onto the document stand 103 (step S405). This request is executed, for example, by displaying a message on the display included on the operation panel 181. Displayed together on this message screen is an operation button for use upon execution of the confirmed conveyance operation described above.

When the user has identified the corresponding sheet piece from an inside of the MFP 100 in accordance with this request, if the user has loaded it onto the document stand 103 and has pressed the image reading start button, the sheet breakage confirmation section 304 which has confirmed that there is a lacking portion judges that there is no lacking portion. At this point, the sheet breakage confirmation section 304 notifies results of the judgment to the stopping release section 305. In accordance with this notification, the stopping release section 305 permits the execution of the image formation in the image formation section 140 (Yes in step S406, S410). This consequently restarts the printing of the print job which has been stopped. Note that the loading of the sheet piece onto the document stand 103 may be performed independently as described above. Moreover, it may be loaded together with the other sheet piece onto the document stand 103 in the state in which its original form is reproduced.

On the other hand, if the corresponding sheet piece cannot be identified, the user can also select the confirmed conveyance operation execution button displayed on the display. If the user does not select the confirmed conveyance operation execution button, the loading of the lacking portion onto the document stand 103 is continuously requested (No in step S406, No in step S407).

If the user has selected the confirmed conveyance operation execution button, the sheet breakage confirmation section 304 executes the confirmed conveyance operation (No in step S406, Yes in step S407, and step S409). If the stopped print job is double-side printing, in the confirmed conveyance operation, the sheet carried into the intermediate tray 174 is immediately carried out, and printing on another side is executed following printing on one side.

Upon confirmation of proper conveyance in the confirmed conveyance operation, the sheet breakage confirmation section 304 notifies this to the stopping release section 305. In accordance with this notification, the stopping release section 305 permits the execution of the image formation in the image formation section 140 (Yes in step S409, S410). It is possible to determine the proper conveyance in the confirmed conveyance operation based on a fact that one sheet has been discharged onto the paper discharge tray 149 as described above and a fact that one sheet has passed through the detection position of the sheet detection sensor 161 which has contributed to the sheet jam detection by the jam detection section 301.

In a case where the proper conveyance could not been performed in the confirmed conveyance operation, a sheet jam is detected again by the jam detection section 301. In this case, the procedures proceed again from stopping of the image formation operation by the printing stop section 302 (No in step S409, S401).

In the configuration described above, in a case where the sheet breakage confirmation section 304 judges, based on the image formed on the sheet, whether or not there is any sheet lacking portion, the sheet breakage confirmation section 304 can recognize whether the lacking portion is located on an upstream side or a downstream side in the sheet conveyance direction. In this case, the sheet breakage confirmation section 304, based on a position of the lacking portion on the sheet and a position of the sheet detection sensor 161 which has detected the sheet jam, may estimate a remaining position of the sheet lacking portion on the conveyance path 145, and guide the position to the user through, for example, the display of the operation panel 181. For example, the sheet breakage confirmation section 304 displays, on the display described above, the arrangement position of the sheet detection sensor 161 which has detected the sheet at the time of the sheet jam detection by the jam detection section 301 as the remaining position of the sheet lacking portion.

Moreover, in the example described above, the sheet breakage confirmation section 304 is so configured as to request for loading, onto the document stand 103, all the sheets remaining on the conveyance path 145. However, the sheet breakage confirmation section 304 may be so configured as to select, based on the position of the sheet on the conveyance path 145, the sheet requested to be loaded onto the document stand 103 in S403. For example, it is also possible to adopt configuration such that in the sheet jam resolving operation by the user, any sheet located at a position where sheet breakage occurs with extremely low possibility is not required to be loaded onto the document stand 103.

Further, in the example described above, the sheet breakage confirmation section 304 is so configured as to constantly request for loading of the sheet taken out from the conveyance path 145 by the user in the sheet jam resolving operation. However, the sheet breakage confirmation section 304 may be so configured as to request for the loading of the sheet taken out from the conveyance path 145 by the user in the sheet jam resolving operation only under specified condition, such as a case where an manager has set it, a case where the user has requested it, and a case where a jam has continuously occurred.

As described above, in this MFP 100, in a case where there is no lacking portion on the sheet taken out from the conveyance path 145 by the user after completion of the sheet jam resolving operation by the user, restart of the image formation is permitted. Specifically, in a case where no sheet piece contributing the breakage remains on the conveyance path 145, the restart of the image formation is permitted. Therefore, reoccurrence of a sheet jam attributable to incomplete sheet removal can be suppressed. Moreover, the user is prohibited from restarting printing in a state in which the sheet piece remains on the conveyance path 145.

Moreover, in the MFP 100, the image formation can be restarted by carrying out the confirmed conveyance operation even under condition that the user cannot identify the sheet piece on the conveyance path 145. In the confirmed conveyance operation, only one sheet is conveyed on the conveyance path 145, and thus even if any sheet piece remains thereon, a number of sheets wasted upon reoccurrence of a sheet jam is only one. Therefore, even upon reoccurrence of a sheet jam, the number of sheets wasted can be minimized. Moreover, the confirmed conveyance operation is carried out at a slower conveyance speed, which can therefore reduce damage even upon the reoccurrence of a sheet jam.

Upon occurrence of a paper jam in the MFP, it is required to remove all the paper remaining on the conveyance path for resolving the jam. Detection on whether or not the paper has been removed can be performed by a paper detection sensor arranged on the conveyance path. However, a typical MFP cannot detect paper remaining at a position which cannot be detected by the paper detection sensor. Therefore, in the typical MFP, for example, in a case where paper has been broken at time of paper removal and its paper piece has remained at the position which cannot be detected by the paper detection sensor, it is judged that the paper has been removed. Restart of printing under this condition results in recurrence of a paper jam. In this case, in addition to the paper removed as a result of the prior paper jam, the paper remaining on the conveyance path upon the reoccurrence of the paper jam is also wasted. As described above, in the MFP which puts a plurality of pieces of paper on standby on the conveyance path, many pieces of paper are wasted.

The embodiment described above has been made in view of such a condition. According to the embodiment described above, reoccurrence of a sheet jam attributable to incomplete sheet removal can be suppressed.

Note that each embodiment described above does not limit a technical range of this disclosure, and in addition to those already described, various modifications and applications can be made within a scope of this disclosure. For example, an image forming apparatus adopting an electrophotographic system has been illustrated in the embodiment above, but this disclosure is also applicable to an image forming apparatus adopting an inkjet system.

Moreover, in the embodiment described above, illustrated as a particularly preferable embodiment is configuration such that the image formation can be restarted even through the confirmed conveyance operation, but also permitted is configuration such that the image formation can be restarted only in a case where there is no lacking portion on the sheet taken out from the conveyance path 145 by the user.

Further, in the embodiment described above, it is configured such that printing of an image related to a stopped print job is also carried out in the confirmed conveyance operation, but it may be configured such that only sheet conveyance is carried out without carrying out printing in the confirmed conveyance operation. In this case, if the stopped print job involves double-side printing, configuration such that only sheet conveyance is also carried out in the inversion section 171 can be adopted. Moreover, in a case where the detection position of the sheet detection sensor 161 which contributes to the sheet jam detection by the jam detection section 301 does not belong to the inversion section 171, even if the double-side printing is the specified print job, it is also possible to adopt configuration such that one sheet does not pass through the inversion section 171 in the confirmed conveyance operation.

In addition, in the embodiment described above, this disclosure is embodied as the digital MFP, but this disclosure is applicable not only to this device but also to any given image forming apparatus, such as a copier, having an image reading function.

INDUSTRIAL APPLICABILITY

According to this disclosure, the reoccurrence of a sheet jam attributable to the incomplete sheet removal can be suppressed, which is useful as an image forming apparatus.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:

an image formation section configured to convey a print sheet and to form an image on the print sheet;

an image reading section acquiring an image of a sheet loaded on a document stand and generating image data;

a plurality of sheet detection sensors being arranged on the print sheet conveyance path;

a CPU; and a storage section storing a program, wherein the CPU performs, in accordance with the program, as a jam detection section, a printing stop section, a resolving operation detection section, a sheet breakage confirmation section, and a stopping release section, the jam detection section detects a sheet jam on the conveyance path based on results of detection by the sheet detection sensors, the printing stop section stops an image formation operation by the image formation section upon the sheet jam detection by the sheet jam detection section, the resolving operation detection section detects completion of an operation of resolving the sheet jam by the user, the sheet breakage confirmation section, upon the detection of the completion of the resolving operation by the resolving operation detection section, requests for loading the sheet, which has been taken out from the conveyance path by the user in the operation of resolving the sheet jam, onto the document stand, and also compares, for the sheet loaded on the document stand, the image data generated by the image reading section after the request for loading the sheet with image data used for printing by the image formation section to judge, when the image data acquired by the image reading section has a lacking portion equal to or larger than a predefined area as compared with the image data used for printing by the image formation section, that there is the lacking portion on the sheet and judge, when the image data acquired by the image reading section has a lacking portion smaller than the predefined area, that there is no lacking portion on the sheet, and the stopping release section, upon judgment by the sheet breakage confirmation section that there is no sheet lacking portion, permits the image formation operation by the image formation section.

2. The image forming apparatus according to claim 1, wherein, upon judgment by the sheet breakage confirmation section that there is a sheet lacking portion, the stopping release section permits the execution of image formation when the sheet lacking portion of the sheet taken out has been loaded on the document stand and an image of the sheet lacking portion has been acquired by the image reading section.

3. The image forming apparatus according to claim 1, wherein, upon judgement by the sheet breakage confirmation section that there is a sheet lacking portion, the stopping release section permits the execution of image formation upon proper conveyance of the sheet through a confirmed conveyance operation which allows the image formation section to convey one sheet on the conveyance path.

4. The image forming apparatus according to claim 3, wherein, at least upon passage of the sheet by the confirmed conveyance operation through the conveyance path portion as an arrangement position of the sheet detection sensor which has detected the sheet at time of the sheet jam detection by the jam detection section, the stopping release section judges that the sheet has been properly conveyed by the confirmed conveyance operation.

5. The image forming apparatus according to claim 3, wherein, in the confirmed conveyance operation, the stopping release section allows the image formation section to convey the sheet at a lower speed than a sheet conveyance speed in a normal conveyance operation.

6. The image forming apparatus according to claim 1, wherein, provided that the position where the sheet jam has been detected is located on a downstream side of an image creating section carrying out the image formation in a sheet conveyance direction, the sheet breakage confirmation section executes the judgment, based on the image formed on the sheet, whether or not there is a sheet lacking portion.

7. The image forming apparatus according to claim 1, wherein, in a case where the arrangement position of the sheet detection sensor which has detected the sheet at the time of the sheet jam detection by the jam detection section is a predefined arrangement position, the sheet breakage confirmation section requests for the loading of the sheet onto the document stand.

8. The image forming apparatus according to claim 1, further comprising a display section, wherein the sheet breakage confirmation section displays, at the display section, the arrangement position of the sheet detection sensor which has detected the sheet at the time of the sheet jam detection by the jam detection section, as a remaining position of the sheet lacking portion.

* * * * *